United States Patent Office

2,956,907
Patented Oct. 18, 1960

---

2,956,907

DYEING OF FABRICS BY MEANS OF PIGMENTS

Andreas Schmitz and Wilhelm Graulich, Leverkusen-Bayerwerk, Germany, assignors to Farbenfabriken Bayer Aktiengesellschaft, Leverkusen, Germany, a corporation of Germany No Drawing. Filed Mar. 29, 1955, Ser. No. 497,806

Claims priority, application Germany Apr. 1, 1954

3 Claims. (Cl. 117—161)

This invention relates to a process for dyeing fabrics by means of pigments.

A large number of processes for dyeing fabrics (piece-dyeing, padding) by means of pigments, which are a modification of pigment printing processes have recently been disclosed. The results which can be produced therewith are not, however, entirely satisfactory, since usually not sufficient account is taken of the fact that the technical demands for dyeing with a padding liquor are such as to require a substantially different chemical colloid system from that existing in printing pastes.

For example it is known to carry out the printing and dyeing operations with those combinations of formaldehyde resin solutions and initial condensates of such resins which form water-in-oil emulsions. The process has been further developed by combining these last-mentioned emulsions with natural rubber latex or latices of the synthetic buna type, but maintaining the water-in-oil type of emulsion. As a result thereof, it is essential to use solvents in the process itself and also to clean the aggregates adapted to carry out the dyeing process with solvents, which undoubtedly is a disadvantage from a technical point of view.

A similar process is known in which the benzine emulsion used as thickening agent contains particularly pure casein which is fixed concurrently with the hardening of formaldehyde initial condensate.

It has now been found that dyeings which are very level and have maximum fastness to washing and rubbing can be obtained by fixing the pigments by means of a combination of a suitable polymer emulsion, an aqueous polyacrylamide solution of high molecular weight and a formaldehyde condensation product, and dispensing with the use of benzine thickeners. Accordingly, the present invention provides a process for dyeing fabrics by means of pigments, wherein the pigments are fixed under the influence of an acid catalyst by the use as fixing agent of a mixture of a stable aqueous copolymer emulsion, an aqueous polyacrylamide solution of high molecular weight, if desired with the addition of an additional component which does not deleteriously affect the solubility of the polyacrylamide, and at least one urea-formaldehyde, sulfonamide-formaldehyde, dicyandiamide-formaldehyde, melamine-formaldehyde or phenol-formaldehyde initial condensate, without the use of a thickening agent with a basis of volatile solvents.

It is important to obtain a dispersion of the polymer emulsion which is as finely-divided and stable as possible in the homogeneous aqueous solution of the polyacrylamide acting as protective colloid and a urea formaldehyde or melamine formaldehyde condensate which is still satisfactorily soluble in water.

In order to meet these conditions, various points have to be borne in mind when choosing the components.

The copolymer emulsions should contain only such synthetic resin components as are able to form a film with maximum stability to chemical and mechanical stresses in view of their chemical composition, and this film should also not swell to any appreciable extent in water. Moreover, the composition of the monomers should be so chosen that a film with the greatest possible stability is formed. It has proved to be advantageous for the polymer to have incorporated therein, by copolymerization, reactive groups of a type which participate in the condensation of the formaldehyde resin, for example methacrylic acid, methacrylamide, α-methyl acrolein and acrylic acid. However, they should not be added in such an amount that too strong a cross-linking takes place, as this would impair the resistance to rubbing of the dyed material and also have a deleterious effect on the feel of said material. Generally speaking, the upper limit of the amount to be added is between 10% and 20% of the amount of monomer containing reactive groups. In other words, the copolymer may contain up to 20% of a component which contains a reactive member selected from the group consisting of COOH, CONH$_2$, and CHO. This limit, however, varies depending on the amount of the formaldehyde initial condensate.

These demands relating to the properties of the film formed from the polymer facilitate the choice of the monomeric components. Soft elastic films are obtained by using butadiene and its homologues and also by the use of esters of acrylic acid and methacrylic acid with 4 or more carbon atoms in the alcohol radical; vinyl ethers also produce a corresponding effect. It is necessary to be very careful in deciding the amounts of these components which are to be used, since it is known that butadiene yields polymers which are sensitive to ageing, and this ageing can only be partially compensated by the addition of suitable antioxidants, while the addition of the butyl ester of acrylic acid considerably reduces fastness to washing.

Substances which are particularly suitable as the second or third component are styrene, dichloroethane, acrylonitrile or methyl methacrylate; these substances improve the brilliance of the dyeings. It is, however, necessary to take into account the hardening action of acrylonitrile which prevents the use of a large amount of this product.

The emulsion polymerization of these components in water can be carried out by conventional methods. The sodium salts of sulfo acids of long-chain paraffins have proved to be particularly suitable as emulsifiers for producing emulsions with particles of the smallest possible size. The necessary stability of the emulsions to pigments and to mechanical stress, and also upon dilution with water, is obtained, for example, by adding polyglycol ethers.

Emulsions which have proved particularly suitable for carrying out the process are those described for example in copending United States patent applications Serial No. 299,012, filed by Wilhelm Graulich and Wilhelm Becker on July 15, 1952 (now abandoned) and Serial No. 226,526, filed by Wilhelm Graulich, Benno Becht, Wilhelm Becker and Heinrich Seibert on May 15, 1951 (now abandoned), which applications are assigned to the same assignee.

The aqueous solution of the polyacrylamide of high molecular weight is most easily produced by polymerizing the monomer in the required amount of water. In this reaction, particular attention should be paid to the temperature, since the chain molecules easily become crosslinked when the temperature is too high, thereby deleteriously affecting the water-solubility of the polymer. In any case it is necessary to prevent the water-solubility being impaired. For example, it has been shown that 90 parts by weight of acrylamide are copolymerized with 10 parts by weight of acrylonitrile, the evenness and the fastness of the dyeings produced with this material are greatly impaired. It follows that when copolymerization components are to be added to the acrylamide for producing high-grade protective colloids, the monomers used should be only those which do not deleteriously affect the water-solubility of the polymer.

The size of the molecule should be as great as possible, i.e. provided that the viscosity of the aqueous solution does not impede the formation of the mixture. When this is so the mechanical strength of the resulting films is improved in the same way as with the polymers in aqueous emulsion. Moreover, a certain flexibility of the padding liquor is also produced.

The formaldehyde resin initial condensates used for fixing purposes should be initially condensed only to such a degree that their water-solubility is not impaired. It has nevertheless been found that dyeings with the best fastness are produced by a maximum degree of condensation within the scope of this limitation. Examples of substances suitable for fixing purposes are the reaction products of phenols with formaldehyde and also the reaction products of ureas, melamine, sulfonamides and dicyandiamides with formaldehyde. However, since the first mentioned substance becomes strongly discolored, it is not suitable for practical use. A substance which is particularly suitable as a fixing agent is a reaction product of 1 mol of urea with 2 mols of formaldehyde which has been condensed to such a degree that it is still just water-soluble. It is also possible for mixtures of the aforementioned nitrogen-containing formaldehyde condensation products to be used. The condensation is carried out by a known process under the influence of an acid catalyst either by decomposing an ammonium salt of a difficultly volatile acid being at a temperature of about 120–150° C., or by passing the padded and initially dried piece through an acid bath or exposing it at an elevated temperature to acid vapours, for example acetic acid vapour.

The dyeings which are produced are so fast to boiling, rubbing and ironing that the fabric can be used for manufacturing articles subject to heavy wear, such as shirts or raincoats. In particular, the swelling qualities of staple fibre fabrics are favourably influenced.

The following examples further illustrate the invention without however limiting it thereto.

Example 1

A mixture is initially formed from 70 parts by weight of a 40% aqueous emulsion of a copolymer of styrene, butadiene and acrylonitrile,
30 parts by weight of a 10% polyacrylamide solution, and
15 parts by weight of a water-soluble initial condensate of formaldehyde and urea. There are then added
20 parts by weight of a 30% dispersion of copperphthalocyanine and
40 parts by weight of secondary ammonium phosphate.

The mixture is finally made up with water to 1000 parts by weight.

A cotton fabric is padded with this dyeing liquor. After intermediate drying at 60–80° C., the fabric is subjected to a temperature of 135° C. for 4 minutes whereby the resin is condensed. The dyeing then obtained is clear blue in color and has very good fastness to washing and rubbing and is also very level.

Example 2

30 parts by weight of a 40% emulsion of a copolymer of as.-dichloroethylene and acrylic acid butyl ester are mixed with
25 parts by weight of a 10% solution of polyacrylamide and
6 parts by weight of dimethylol urea. There are then added
5 parts by weight of a 20% dispersion of $\alpha,\alpha'$-dibenzoylaminoanthraquinone and
4 parts by weight of ammonium nitrate.

The resulting mixture is made up to 1000 parts by weight with water, and a staple fibre is padded with this mixture and dried and the resin is condensed in the manner hereinbefore described. A yellow dyeing is obtained which has very good fastness properties.

Example 3

Initially a mixture of the following products is formed:

30 parts by weight of a 40% aqueous emulsion of a copolymer of styrene, butadiene and methacrylamide,
15 parts by weight of a 10% polyacrylamide solution, and
15 parts by weight of an initial condensate of urea and formaldehyde. There are then added
10 parts by weight of a 25% dispersion of $\alpha,\alpha'$-dianthrimide, and
3 parts by weight of secondary ammonium phosphate.

The mixture is made up to 1000 parts by weight with water and a fabric of polyamide fibres is padded with the resulting liquor. After intermediate drying, the dyeing is fixed for 4 minutes at 140–145° C. The dyeing obtained has a strong rose color and is very fast to washing and wet rubbing.

Example 4

30 parts by weight of a 40% emulsion of a copolymer of butadiene and styrene are mixed with
30 parts by weight of a 10% polyacrylamide solution,
90 parts by weight of a water-soluble initial condensate of melamine and formaldehyde, and
5 parts by weight of a wax-like but water-soluble condensation product of a polyalcohol and ethylene oxide. This mixture is mixed with
10 parts by weight of a 25% aqueous paste of chlorinated copper phthalocyanine and
4 parts by weight of ammonium chloride and also, as buffering substance,
1 part by weight of a non-volatile organic base.

By making this mixture up to 1000 parts by weight with water, a stable padding liquor is obtained. A suitable cotton fabric is then padded with this dye liquor. The material is then dried at about 50° C., until the residual moisture content is 12–15%. The material is then passed through an embossing calender heated to 180–200° C. and resin formation is completed by condensation at 140–160° C. The design which is thus embossed on the fabric is dyed green and is fast to washing.

We claim:

In a process for fixing onto a fiber a pigment in a padding liquor, said fixing being carried out by means of a fixing agent under the influence of an acid catalyst with subsequent condensation of the fixing agent by means of heat, the improvement which comprises utilizing as fixing agent a mixture of (1) a stable aqueous emulsion of a thermoplastic vinyl copolymer, (2) an aqueous polyacrylamide solution of high molecular weight as protective colloid for said emulsion and (3) at least one water-soluble initial condensate selected from the group consisting of urea-formaldehyde, sulfonamide-formaldehyde, dicyandiamide-formaldehyde, melamine-formaldehyde, and phenol-formaldehyde.

2. A process as in claim 1 wherein said water-soluble initial condensate is formed from one mole of urea and two moles of formaldehyde.

3. A process as in claim 1 wherein said copolymer contains up to 20% of a component which contains a reactive member selected from the group consisting of COOH, CONH$_2$, and CHO.

References Cited in the file of this patent

UNITED STATES PATENTS

| | | |
|---|---|---|
| 2,173,005 | Strain | Sept. 12, 1939 |
| 2,342,641 | Cassel | Feb. 29, 1944 |
| 2,494,810 | Hobday | Jan. 17, 1950 |
| 2,653,140 | Allenby et al. | Sept. 22, 1953 |
| 2,656,327 | Van Wirt | Oct. 20, 1953 |
| 2,691,005 | Booth | Oct. 5, 1954 |
| 2,719,832 | Craemer | Oct. 4, 1955 |
| 2,744,035 | Fierstein | May 1, 1956 |

FOREIGN PATENTS

| | | |
|---|---|---|
| 626,581 | Great Britain | July 18, 1953 |